United States Patent
Walters

(10) Patent No.: US 6,799,808 B1
(45) Date of Patent: Oct. 5, 2004

(54) DUMP TRUCK AUTOMATIC MUD FLAP RETRACTOR SYSTEM

(76) Inventor: Corey J. Walters, R.D. 1, P.O. Box 240, Mt. Union, PA (US) 17066

(*) Notice: Subject to any disclaimer, the term of this patent is extended or adjusted under 35 U.S.C. 154(b) by 0 days.

(21) Appl. No.: 10/146,935

(22) Filed: May 17, 2002

(51) Int. Cl.[7] .............................................. B62D 25/16
(52) U.S. Cl. .................................... 298/1 SG; 280/851
(58) Field of Search .......................... 298/1 SG, 17 R; 280/847, 848, 851, 154

(56) References Cited

U.S. PATENT DOCUMENTS

| | | | |
|---|---|---|---|
| 2,653,846 A | | 2/1953 | Wiley |
| 2,721,760 A | * | 10/1955 | Lapham et al. ........... 298/1 SG |
| 2,857,200 A | | 10/1958 | Hoppesch |
| 2,872,211 A | | 2/1959 | Barrett |
| 3,165,360 A | * | 1/1965 | Saxton et al. ............. 298/1 SG |
| 3,203,710 A | * | 8/1965 | Harting, Jr. |
| 3,248,126 A | | 4/1966 | Saxton et al. |
| 3,310,344 A | | 3/1967 | Beintum et al. |
| 3,507,513 A | | 4/1970 | Bohrer |
| 3,580,604 A | | 5/1971 | Overbend |
| 3,582,109 A | | 6/1971 | Moore |
| 3,640,577 A | * | 2/1972 | Ducote ..................... 298/1 SG |
| 3,794,383 A | * | 2/1974 | France et al. ............. 298/1 SG |
| 3,802,739 A | * | 4/1974 | Knyszel et al. ........... 298/1 SG |
| 3,806,196 A | * | 4/1974 | Cole et al. ................ 298/1 SG |
| 3,806,197 A | * | 4/1974 | Knyszek et al. .......... 298/1 SG |
| 3,809,167 A | * | 5/1974 | Glider |
| 3,934,901 A | | 1/1976 | Hammerly |
| 4,097,090 A | | 6/1978 | Payne |
| 4,221,432 A | * | 9/1980 | VanRemortel et al. .... 298/1 SG |
| 5,582,431 A | | 12/1996 | Anderson |
| 6,139,062 A | | 10/2000 | Meyer |
| 6,158,775 A | | 12/2000 | Nickels |

* cited by examiner

Primary Examiner—Stephen T. Gordon
(74) Attorney, Agent, or Firm—C. J. Husar, Esq.

(57) ABSTRACT

The disclosure relates to an automatic mud flap retractor system for commercial dump trucks wherein the mud flaps are automatically activated into their raised position when the operator of the vehicle places the transmission gear in reverse during backingup of the truck to receive or discharge a load and lowered when the driver depresses a deactivating button in the cab. An indicator light in the cab of the vehicle is also activated to inform the driver that the mud flaps have been raised and it is now safe to discharge his load. The system utilizes a plurality of short stroke pistons/cylinders and a unique pulley and cable arrangement permitting the operating mechanism to be located directly above the mud flaps wherein the length of the cables required is kept to a minimum thus reducing the overall space requirements of the system. The operating mechanism is enclosed in a compact housing unit that is mounted to the vehicle utilizing the previously used non-retracting mud flap mounting bolts. The system utilizes the electrical and fluid pressure systems of the vehicle to activate and operate the pistons in their retracting and extending modes. There is a second embodiment wherein a single cable is utilized to retract the mud flap with only three single pulleys are required for its operation, all other components remain the same.

10 Claims, 5 Drawing Sheets

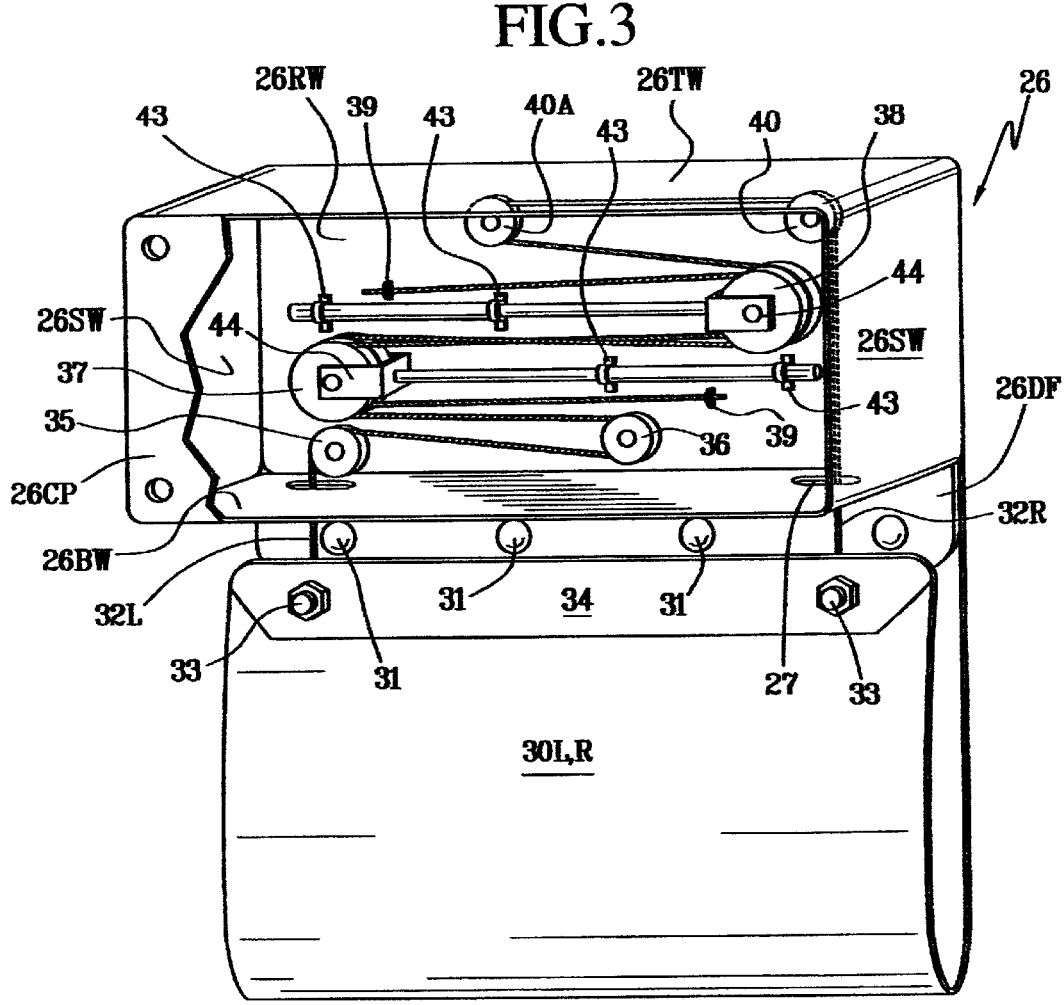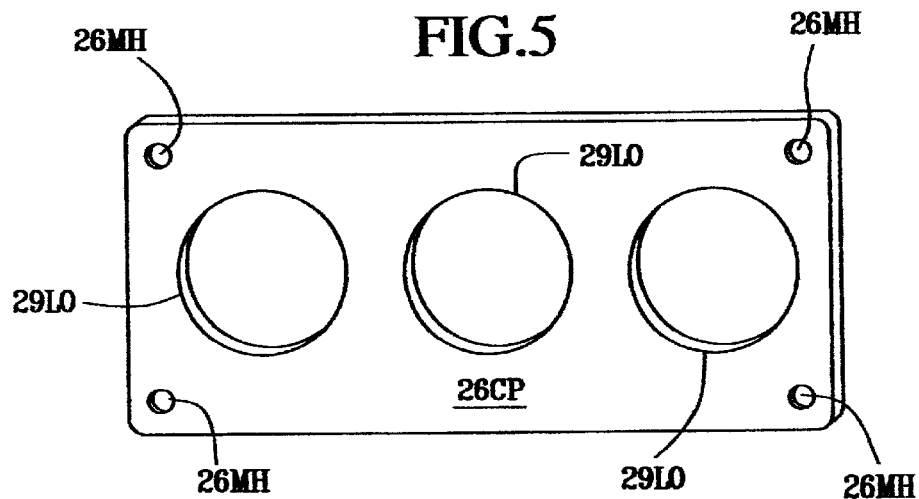

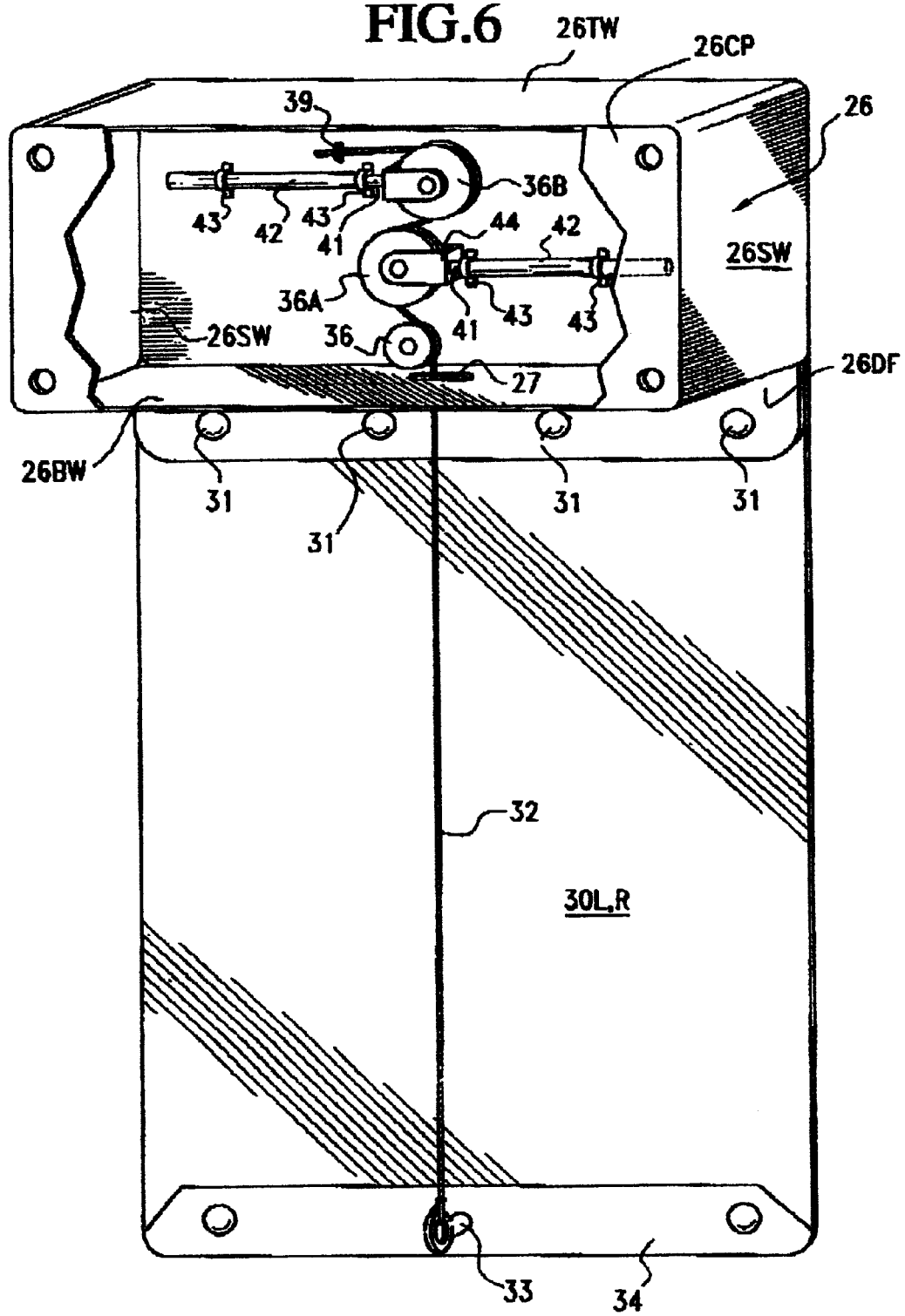

DUMP TRUCK AUTOMATIC MUD FLAP RETRACTOR SYSTEM

BACKGROUND OF THE INVENTION

The present invention relates to truck mud flaps and more specifically it relates to automatically retracted mud flaps used on dump trucks. As we all know, mud flaps are required equipment on all trucks to prevent the discharge of pebbles, rocks, dried mud clumps or the like that are lodged between the tires of the truck and subsequently becoming dislodged and discharged onto a following vehicle and causing damage to the vehicle or possibly resulting in loss of control of the vehicle by an object striking the windshield, causing serious vehicle damage as well as possible personal injury to the occupants of the vehicle.

In an effort to prevent such a scenario from taking place, state laws have been enacted that requires mud flaps on trucks to be of a certain size, located at a certain position relative to the rearmost wheels of the truck and extend vertically for a specified distance, the standard mud flap is twenty-four inches wide by thirty-six inches long. However, due to the adverse conditions that most commercial dump trucks operate under, most mud flaps seen on trucks are somewhat less than the required dimensions since they have been damaged in a variety of ways when the truck is used in backing up to either receive or discharge a load. Some of the instances where mud flaps are damaged due to entanglement with the rear wheels during operating in reverse include backing into an embankment where the mud flaps are forced under the rearmost wheels, operating in soft soil conditions where the wheels sink into the soft, muddy soil and the mud flaps become entangled or operating in reverse with various types of auxiliary equipment such as loading a road paver where the mud flaps are pulled into the revolving rollers causing serious damage to the mud flaps. In some instances where trucks are provided with retractable mud flaps, the rise of the bottom of the mud flap is insufficient, resulting in a loop of the mud flap near the bottom, whereby this loop becomes filled with load discharge and is torn from its mounting when the truck is pulled away. It is with this knowledge in mind that applicant has developed a mud flap retractor system that automatically becomes engaged when the driver of the truck places the transmission in reverse to begin backing up and is raised to a sufficient height whereby the above noted problems are eliminated.

DISCUSSION OF THE PRIOR ART

A pre-examination search of the prior art was made by applicant and revealed the following patents.

U.S. Pat. No. 2,653,846—issued to G. D. Wiley on Sep. 29, 1953—discloses a rear wheel splash guard for a dump truck that is manually operated through the use of a plurality of interconnected linkages beginning with actuating lever 36 that activates a rigid splash guard and moves from a vertical position to a substantially horizontal position as shown in FIG. 1. This unit is not automatically operated as in the subject application and relates to a rigid splash guard rather than a pliable, flexible flap as presently in use on most trucks today.

U.S. Pat. No. 2,857,200—issued to G. Hoppesch on Oct. 21, 1958—discloses a rigid mud flap that is retractable by use of a hydraulic system that is tied in with the hydraulics of the vehicle in response to the dumping of a load during use. In this patent emphasis is placed on the fact that the mud flap is made of a rigid construction to prevent entanglement with the rear wheels during a dumping operation.

U.S. Pat. No. 2,872,211—issued to R. F. Barrett on Feb. 3, 1959—discloses a retractor system that is manually actuated through the use of a cable that rotates the guard from its normal rear wheel position to a position on the outboard side of the wheel during the dumping operation and is returned to its rearward position by a biasing spring. Here again, the operation is manual requiring the initiation of the retraction by the driver of the truck.

U.S. Pat. No. 3,248,126—issued to G. R. Saxton et al on Apr. 26, 1966—discloses a mud flap retractor system that is operated through a pneumatic cylinder that activates a member having a pair of cables attached thereto for retracting the flaps.

U.S. Pat. No. 3,310,344—issued to M. Beintum et al on Mar. 21, 1967—discloses a spring assisted system that operates through a series of rods to flip the mud flap to a horizontal position in preparation for the dumping operation.

U.S. Pat. No. 3,507,513—issued to A. H. Bohrer on Apr. 21, 1970—discloses a system utilizing a plurality of sprockets, rollers and a chain to retract the mud flap into a horizontal position within a frame mounted casing.

U.S. Pat. No. 3,580,604—issued to T. F. Overbend on May 25, 1971—discloses a mud flap assembly that utilizes a pair of vertically spaced parallel flaps on each side of the vehicle with a plurality of cantilevers that are spring biased in one direction whereby the outer flap is raised to a confronting position relative to the inner flap thus shortening its length to prevent engagement with any material present in the vicinity of the flaps.

U.S. Pat. No. 3,582,109—issued to V. Moore on Jun. 1, 2971—discloses a system wherein a cable is attached to each mud flap and operated by a single pneumatic cylinder that operates a pivotable lever arm to retract the cables and simultaneously retract the mud flaps.

U.S. Pat. No. 3,934,901—issued to R. C. Hammerly on Jan. 27, 1976—discloses a quick release mud flap hanger that requires manual removal of a detent connected hanger from its socket to prevent damage to the mud flap during dumping of a load.

U.S. Pat. No. 4,097,090—issued to C. Payne on Jun. 27, 1978—discloses a bracket mechanism that is attached to the tailgate and elevates the flaps while maintaining their vertical positions when an air cylinder is activated in preparation for dumping.

U.S. Pat. No. 5,582,431 issued to G. D. Anderson on Dec. 10, 1996—discloses a retractable mud flap that includes an enclosure for the mud flaps when they are retracted into a horizontal position by pneumatic or hydraulic cylinders.

U.S. Pat. No. 6,139,062—issued to D. Meyer on Oct. 31, 2000—discloses a pneumatic cylinder that operates a series of linkages including a C-shaped arm that swings in an operation arcuate path to engage the mud flap and raise it up sufficiently during a dumping.

U.S. Pat. No. 6,158,775—issued to D. R. Nickels on Dec. 12, 2000—discloses a system that includes a single power cylinder that operates a pair of cables that ride over a series of rollers and guide the cables when pressure is applied to the cylinder to retract the mud flaps.

As can be seen from a review of the above cited patents, many attempts have been made to come up with a mud flap system that satisfies the needs of the trucking industry. However, due to the complex, cumbersome arrangements of the prior art devices, there still remains a need for a mud flap retractor system that is easy to install, takes up a minimum amount of space, is readily accessible and is automatically energized once the driver of the truck places the transmission in reverse gear. None of the prior art devices disclose a housing for a plurality of cylinders that are located immediately above the mud flaps in a compact, easily accessible location that is mounted onto the housing frame for the mud flaps and provides a mounting for the rear lights of the vehicle. By means of this location in close proximity to the mud flaps, the length of the operating cables and the stroke of the operating cylinders is significantly reduced thus reducing the amount of space required as well significant reduction in the overall costs of the system.

SUMMARY OF THE INVENTION

The present invention provides an automatically activated mud flap system that is conveniently located in close proximity to the mud flaps and is readily adaptable to all trucks using standard sized mud flaps by using the mounting holes of the currently used mud flaps. The system utilizes a pair of double-acting power cylinders for each mud flap that are tied in with the vehicle's electrical system and either the air or hydraulic systems found on all such vehicles thus ensuring release of the mud flaps upon completion of the dumping operation. The system is comprised of a separate housing for each of the pair of compact units that are readily attached to the presently available mounting frame used for suspending the mud flaps and includes the rear lights such as the brake light, back-up light and turn signals. The system further includes two power cylinders for each mud flap and cooperating pulleys to guide the cables during their lifting or releasing procedures. The cable attachment location is positioned sufficiently low on the mud flap whereby the mud flaps are raised one-half the length of the flap when retracted thus ensuring that there will not be any interfering low positioned loop contact during a dumping operation. Additionally, weights are provided for each mud flap to ensure rapid lowering of the mud flaps upon completion of a dumping operation.

OBJECTS OF THE INVENTION

An object of the invention is to provide an automatic mud flap retractor system for dump trucks.

A further object of the invention is to provide a mud flap retractor system that initiates engagement when the truck operator places the transmission in reverse gear.

A still further object of the invention is to provide a mud flap retractor system that includes a unique pulley arrangement wherein the required lift of the mud flaps is accommodated with a minimum amount of piston rod extension thus reducing the overall size and space requirements for the retractors.

A further object of the invention is to provide the mud flap retractor system in kit form to allow retro-fitting of currently used non-retractable mud flaps.

Yet another object of the invention is to provide a mud flap retractor system that utilizes double-acting power cylinders and weights for each mud flap thus ensuring release of the mud flaps into their down position by merely actuating a release button located in the cab of the vehicle.

These and other objects of the invention will become more apparent hereinafter. The instant invention will now be described with particular reference to the accompanying drawings wherein like reference characters designate like or corresponding parts throughout the several views.

BRIEF DESCRIPTION OF THE DRAWINGS

FIG. 3 is a rear view of a retracted mud flap with its associated operating components showing the extent of retraction after the system has been activated.

FIG. 5 is an illustration of the front cover for the housing that contains the cylinders, pulleys and cables illustrating the apertures for the rear lighting system of the vehicle.

FIG. 6 is an illustration of a second embodiment wherein a single cable is used to retract each mud flap.

DETAILED DESCRIPTION OF THE DRAWINGS

Figure 1:
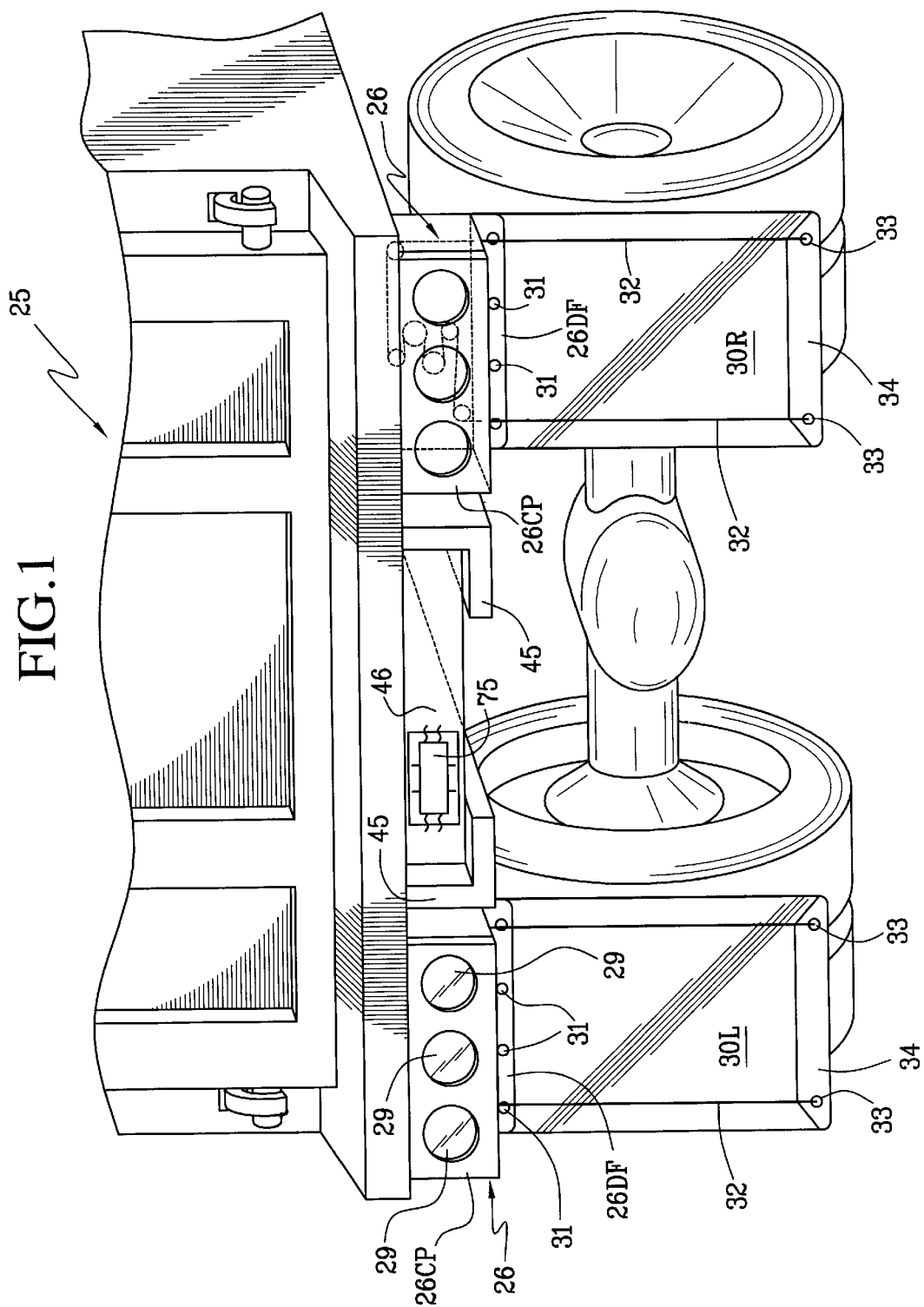
FIG. 1 is a perspective view of the rear end of a conventional dump truck with the novel automatic mud flap retractor system installed thereon. As shown, the dump truck is provided with a pair of housings for holding the operating mechanism of the system.

Referring now to FIG. 1, there is illustrated a perspective view of the rear portion of a conventional dump truck 25 with a left mud flap 30L and a right mud flap 30R, both of which are equipped with the novel mud flap retractor system. As shown, the actuating mechanism for each mud flap is contained within a housing 26 that is operably attached to the truck body through the use of a plurality of bolts 31, that were previously used to mount the non-retracting mud flaps. Left mud flap 30L is shown with its cover plate 26CP mounted on housing 26 with a plurality of lenses 29 fixedly secured therein for the rear lights of the truck 25. Housing 26 includes an outer depending flange 26DF that extends downward from rear wall 26RW with a plurality of spaced holes therein for receiving bolts 31 to mount housing 26 to the previous mounting holes for the mud flap. Mud flap 30L is actuated by a pair of cables 32L, 32R that lead from within housing 26 through slots 27 and extend downwardly in front of the mud flap 30L where they are anchored near the bottom edge by a pair of spaced eyebolts 33 that also serves to secure a weights 34 thereto. The purpose of the weights is to assist in the lowering of the mud flap 30L when the operator presses the momentary release button within the cab of the truck.

Right mud flap 30R is set up in the same manner as the just described left mud flap 30L, in the drawing, however, light lenses 29 have been removed to give an illustration of the pulley and cable arrangement, partially shown in dotted lines, and which will be described in greater detail later with respect to FIG. 2 and 3. Positioned horizontally between frame rail members 45 is a mounting plate 46 that is used to support low voltage detent solenoid valve 75, here again, the details of the operation of solenoid detent valve 75 will be discussed in greater detail later in a discussion of FIG. 4. As can be seen from this view, there is no structural modification required to the truck, other than installation of support plate 46, to successfully install the novel automatic mud flap retractor system.

Figure 2:
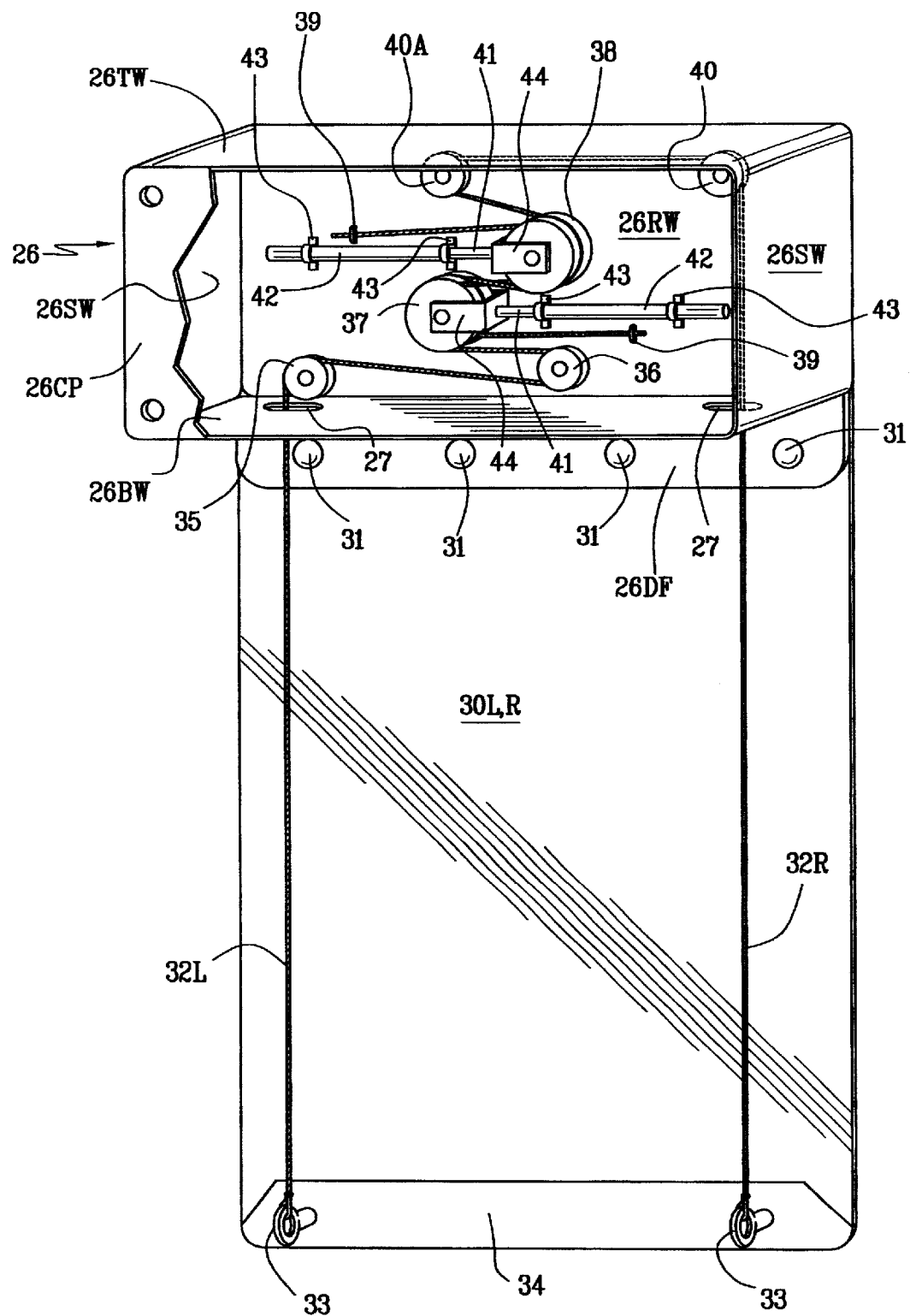
FIG. 2 is a rear view of an extended mud flap with its associated cables, pulleys and actuating cylinders in its housing with the front cover partially removed to illustrate the internal arrangement of the actuating components.

Turning now to FIG. 2, there is illustrated the arrangement of the cables over the pulleys and their path of travel. As shown, housing 26 is provided with a rear wall 26RW with the front of housing 26 open and provided with a cover plate 26CP (partially shown), a top wall 26TW, a pair of side walls 26SW and an interconnected bottom wall 26BW with a pair of spaced slots 27 for allowing passage of cables 32L and 32R into the interior of housing 26. After passing through slot 27, left cable 32L passes over a first single pulley 35 and then onto a second single pulley 36 where it reverses its direction, then onto a first double pulley 37 where it reverses its direction again, then onto a second double pulley 38 where it reverses its direction a third time and is finally anchored at 39. Right cable 32R is connected to eyebolt 33 at the bottom of the mud flap 30 L,R and passes upwardly through slot 37 and passes over a first single pulley 40, then passes over a second single pulley 40A, reverses it direction, then passes over second double pulley 38, reverses its direction again, and then passes over first double pulley 37, reverses it direction again, and is then anchored at 39. Each of the double pulleys, 37 and 38, is operably attached to a piston rod 41 that extends from their respective power cylinders 42 and are connected to pistons (not shown) within cylinders 42. Each of cylinders 42 is fixedly mounted to rear wall 26RW by a pair of brackets 43 while piston rods 41 are interconnected with double pulleys by a U-shaped bracket 44. As can be seen, each of cables 32L and 32R is extended in opposite directions by double pulleys 37 and 38 when power cylinders 42 are pressurized in response to activation of solenoid detent valve 75. It this novel arrangement of single and double pulleys with multiple reversals of the cables that allows a relatively short piston travel to efficiently operate cables 32L and 32R the required distance to retract mud flaps 30L and 30R into their raised dumping position with a minimum amount of piston rod extension permitting the compact arrangement shown in the drawings. The cylinders used are commercially available as Part #0750 D 01-06A, Numatics Air cylinder ¾"×6" Double Acting With Magnet.

Turning now to FIG. 3, there is shown an illustration similar to that of FIG. 2, however, in this view, mud flaps 30L,R (only one shown) have been retracted into their raised position by the extension of the piston rods 41 from their respective power cylinders 42. As can be seen, mud flaps 30 L,R have been doubled over with the lowermost edge of the flaps being elevated to the level of mounting bolts 31 thus ensuring that there will be no interference with the load dumping process.

Figure 4:
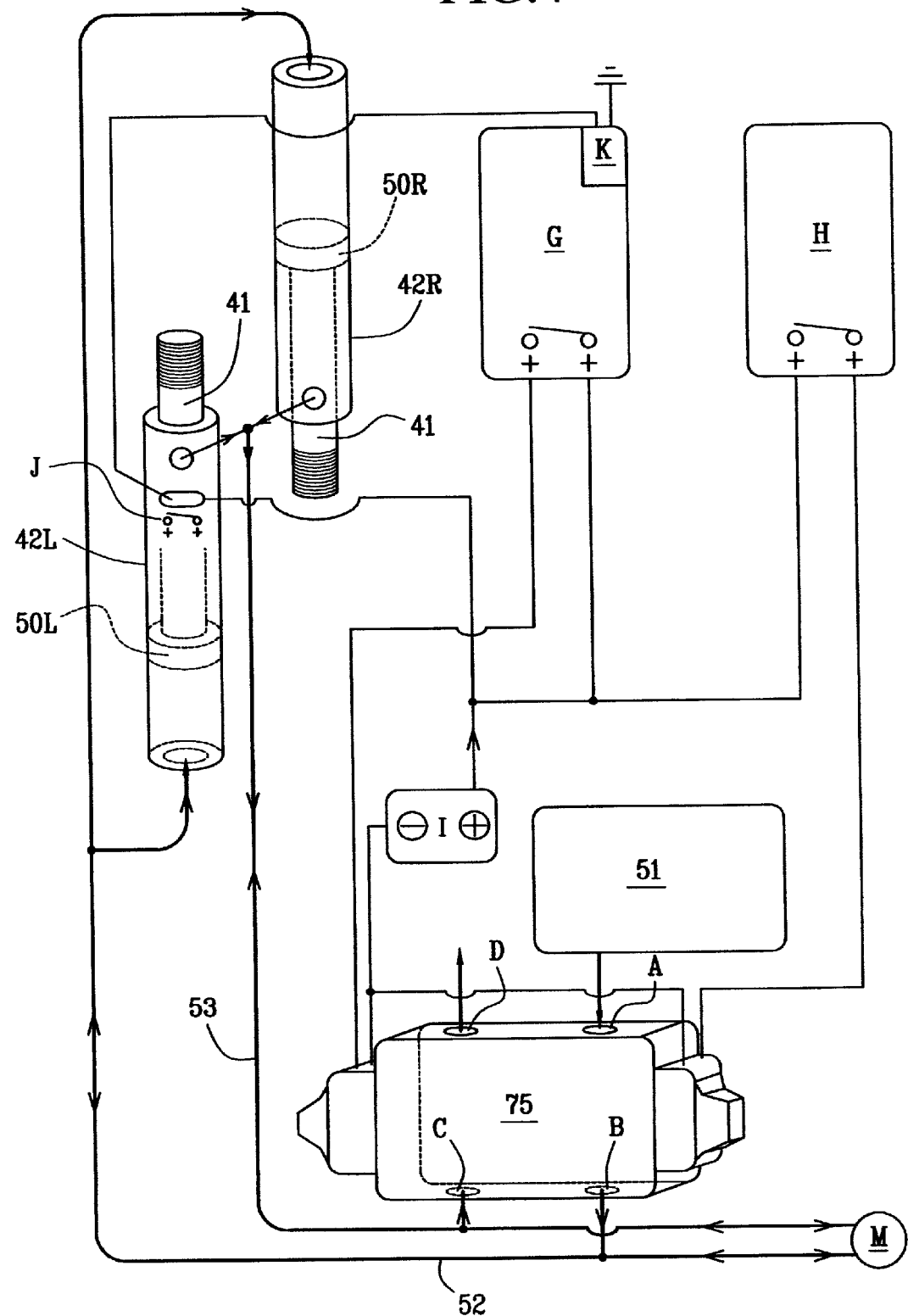
FIG. 4 is a schematic of the electrical and pressure operating system for extending and retracing one the mud flaps, an identical arrangement is utilized for the second mud flap.

Referring now to FIG. 4, there is a shown a schematic illustration of the electrical and power cylinder fluid paths, either pneumatic or hydraulic, utilized in operating the power cylinders 42L. 42R. As illustrated, both cylinders 42L and 42R are shown with their respective pistons 50L and 50R illustrated in dotted lines, connected to piston rods 41 that are shown partially extended from cylinders 42L and 42R, this is the retracted position of the pistons 50L and 50R within cylinders 42L and 42R and the extended or down position of mud flaps 30 L,R. Fluid power is provided by reservoir 51, it can be either pneumatic or hydraulic fluid within reservoir 51 that is tapped into the truck's pneumatic or hydraulic system and supplied to solenoid detent valve 75 while a low voltage current is provided by low voltage source I. Solenoid detent valve 75 has four ports A, B, C and D with port A being the fluid pressure inlet or supply port. Ports B, C and are alternately inlet and outlet ports, i.e. when the operator of the truck places the transmission in reverse gear, transmission switch H, which receives low voltage current from low voltage supply I, closes to immediately complete the electrical circuit and provides an electrical connection to energize low voltage detent solenoid valve 75, since the electrical system is always energized when the vehicle is operating, and opens port B, which is initially utilized as an outlet port for supplying pressure fluid to cylinders 42 (all four of them, with only two shown in FIG. 4), via lines 52 to extend piston rods 41, simultaneously, port C serves as an inlet port into solenoid detent valve 75 for receiving exhaust fluid from the exhaust side of cylinders 42 via return lines 53. as piston rods 41 are extending, double pulleys 37, 38 move in opposite directions and extert an outward force on cables 32L, 32R thus raising the lowermost ends of mud flaps 30L, 30R until they assume the position shown in FIG. 3. Upon completion of the stroke of piston rods 41, piston 50L of the left cylinder 42L comes into the vicinity of built-in magnetic switch J, it closes magnetic switch J and completes the electrical circuit and activates LED indicator light K within the cab of the vehicle to inform the driver that the mud flaps have been retracted. When it is desired to reverse the operation of the cylinders 42 and allow mud flaps 30 L,R to be lowered, depressing momentary push button G, which is located in the cab of the vehicle, supplies current to the other side of solenoid dent valve 75 and moves solenoid detent valve 75 into a position whereby fluid pressure is directed out port C to the opposite side of pistons 50 via lines 53 and port B becomes an exhaust receiving port receiving exhaust fluid via lines 52. Upon movement of piston 50 away from the vicinity of magnetic switch J, switch J opens and breaks the electrical connection and indicator LED light K is deactivated and goes out, thus informing the driver of the truck that the mud flaps 30L,R are now in their extended position. FIG. 4 shows only one-half of the system, it is to be understood that fluid pressure lines 52 and 53 extend to the right of the circle with the letter "M" inside and supply pressurizing fluid to the second set of cylinders 42 that operates the other mud flap and also receive the exhaust fluid therefrom. Solenoid detent valve 75 is commercially available as Part #L01SS459B00060, Numatics L Series Valve 12V DC ⅛ NPT ports, hardwired.

FIG. 5 is an illustration of the cover and light holder 26 CP per se, with lenses 29 removed. As shown, a plurality of mounting holes 26MH are provided for securing cover plate 26CP to housing 26 and a plurality of lens openings 29LO are shown for receiving the rear lights of the vehicle.

FIG. 6 is an alternative embodiment wherein a single cable 32 is operably attached to the bottom of mud flap 30 L,R at 33 and passes through slot 27 in bottom wall 26BW, then passes over first single pulley 36, then over a larger diameter single pulley 36A which is operably connected to the piston rod 41 of the lower cylinder 42, then over a second large diameter pulley 36B which is connected to the piston rod 41 of the upper cylinder 42 after which it is anchored at 39. As can be seen in this view, large pulleys 36A and 36B are moved in opposite directions as the cylinders 42 are pressurized and extended. This embodiment requires fewer parts than the first embodiment. However, the first embodiment is the preferred embodiment in that it provides assurance that the mud flap will be uniformly retracted without any curl-over of the flap when raised.

While the invention has been described in its preferred embodiment, it is to be understood that the words that have been used are words of description rather words of limitation and that changes may be made within the purview of the appended claims without departing from the full scope or spirit of the invention.

Having thus described my invention, I claim:

1. An automatic mud flap retractor system for operating a plurality of mud flaps on a motor vehicle comprising:

electrical means operably connected to the electrical system of said vehicle;

pressure fluid means controlled by said electrical means for pressurizing a plurality of pressure cylinders;

cable operating means including a plurality of cables operably connected at one end to said mud flaps with the opposite terminal end securely anchored;

pulley means cooperating with said plurality of cables for guiding said cables alone their paths;

actuating means including said plurality of pressure cylinders for controlling the movement of said cables; and indicator means including an indicator light mounted within the cab of said vehicle for indicating a raised condition of said mud flaps when a vehicle transmission has been placed in reverse gear and said pressure cylinders have successfully raised said mud flaps in preparation for discharging a load.

2. An automatic mud flap retractor system as defined in claim 1 wherein said electrical means includes an electrically operated detent valve for controlling the direction of pressure fluid to and from said pressure cylinders.

3. An automatic mud flap retractor system as defined in claim 2 wherein said electrical means further includes a magnetically actuated switch that is mounted on one of said pressure cylinders and closes when a piston therein has reached the end of its extending stroke thus completing an electrical circuit to energize said indicator light in said cab.

4. An automatic mud flap retractor system as defined in claim 3 wherein said electrical means further includes a momentary release button mounted in said cab in the vicinity of said indicator light for sending a signal to said pressure fluid means whereby pressurizing fluid is directed to an opposite end of said pressure cylinders and said cable operating means is released thus lowering said mud flaps to an extended position and said indicator means is de-energized thus indicating that said mud flaps have been successfully extended.

5. An automatic mud flap retractor system as defined in claim 2 wherein said electrically operated detent valve is a two position valve moveable from a first position to a second position with a pair of ports that alternately serve as supply and exhaust ports, a pressure port and a fourth port serving as a permanent system exhaust port whereby when said valve is in said first position, one of said alternating ports supplies pressure fluid to one side of said pressure cylinders while said other alternating port receives exhaust fluid from the opposite side of said pressure cylinders and when said valve is in said second position, the flow of pressurizing fluid to and from said pressure cylinders is reversed.

6. An automatic mud flap retractor system as defined in claim 1 wherein said cable operating means comprises a pair of cables for each mud flap.

7. An automatic mud flap retractor system as defined in claim 1 wherein said plurality of cables comprises a single cable for each mud flap.

8. An automatic mud flap retractor system as defined in claim 6 wherein said cable operating means further includes a compact housing;

having a width equal to the width of said mud flaps and a height and depth sufficient to enclose said plurality of pressure cylinders, said plurality of cables and said pulley means when in their extended positions.

9. An automatic mud flap retractor system as defined in claim 8 wherein said pulley means comprises a plurality of single pulleys and a pair of double pulleys with said single pulleys rotatably mounted in said housing for guiding said cables to said double pulleys which are operably attached to said pressure cylinders.

10. An automatic mud flap retractor system as defined in claim 1 wherein said pulley means comprises three single pulleys and a single cable is centrally attached to a respective one of said mud flaps.

* * * * *